United States Patent
Schwaiger

(10) Patent No.: US 10,300,978 B2
(45) Date of Patent: May 28, 2019

(54) FOLDABLE BICYCLE FRAME

(71) Applicant: Thomas Schwaiger, Viehhausen (AT)

(72) Inventor: Thomas Schwaiger, Viehhausen (AT)

(73) Assignee: Thomas Schwaiger, Viehhausen (AT)

( * ) Notice: Subject to any disclaimer, the term of this patent is extended or adjusted under 35 U.S.C. 154(b) by 97 days.

(21) Appl. No.: 15/329,692

(22) PCT Filed: Jul. 27, 2015

(86) PCT No.: PCT/AT2015/050178
§ 371 (c)(1),
(2) Date: Jan. 27, 2017

(87) PCT Pub. No.: WO2016/015073
PCT Pub. Date: Feb. 4, 2016

(65) Prior Publication Data
US 2017/0210439 A1    Jul. 27, 2017

(30) Foreign Application Priority Data

Jul. 29, 2014   (AT) ............................ GM50121/2014

(51) Int. Cl.
*B62K 15/00* (2006.01)
*B62K 19/18* (2006.01)
*F16B 7/04* (2006.01)

(52) U.S. Cl.
CPC ............ *B62K 15/008* (2013.01); *B62K 19/18* (2013.01); *F16B 7/04* (2013.01)

(58) Field of Classification Search
CPC .......... B62K 15/008; B62K 19/18; F16B 7/04
(Continued)

(56) References Cited

U.S. PATENT DOCUMENTS 4,460,191 A * 7/1984 Ishibashi .............. B62K 15/008
                                                280/278
5,186,482 A * 2/1993 Sapper ................. B62K 15/008
                                                280/278
(Continued)

FOREIGN PATENT DOCUMENTS

DE    202012006459 U1   8/2012
EP        2409906 A2    1/2012
(Continued)

OTHER PUBLICATIONS

English translation of International Search Report for PCT/AT2015/050178.

*Primary Examiner* — Joseph M Rocca
*Assistant Examiner* — Felicia L. Brittman
(74) *Attorney, Agent, or Firm* — Dickinson Wright LLP

(57) ABSTRACT

In order to provide a foldable bicycle frame which can be folded to form a very small packing size on the one hand and also satisfies high stability requirements on the other hand, a foldable bicycle frame is provided in accordance with the invention, comprising a seat tube (1) for accommodating a seat post (2), an upper tube (3), a head tube (4), a lower tube (5), two chain stays (6) and two seat stays (7), wherein a first releasable locking mechanism is provided in order to connect, in an unfolded state of the bicycle frame, the seat post (2), the seat tube (1), the upper tube (3) and the seat stays (7) in a rigid and detachable manner to each other and to fix the position to each other.

17 Claims, 7 Drawing Sheets

(58) Field of Classification Search
USPC .......................................................... 280/287
See application file for complete search history.

(56) References Cited

U.S. PATENT DOCUMENTS

| | | | | |
|---|---|---|---|---|
| 6,367,824 | B1* | 4/2002 | Hayashi | B62K 5/05 |
| | | | | 280/124.103 |
| 6,986,522 | B2* | 1/2006 | Sinclair | B62K 15/006 |
| | | | | 280/278 |
| 2005/0062256 | A1* | 3/2005 | Chen | B62K 15/008 |
| | | | | 280/287 |
| 2007/0069499 | A1* | 3/2007 | Lin | B62K 15/008 |
| | | | | 280/287 |
| 2011/0148069 | A1* | 6/2011 | Ho | B62K 15/008 |
| | | | | 280/278 |

FOREIGN PATENT DOCUMENTS

| | | |
|---|---|---|
| WO | 2011161657 A1 | 12/2011 |
| WO | 2013016958 A1 | 2/2013 |

\* cited by examiner

FOLDABLE BICYCLE FRAME

BACKGROUND OF THE INVENTION

The present invention relates to a foldable bicycle frame and a bicycle comprising such a foldable bicycle frame, the foldable bicycle frame comprising a seat tube for accommodating a seat post, an upper tube, a head tube, a lower tube, two chain stays and two seat stays, wherein a first releasable locking mechanism is provided in order to connect, in an unfolded state of the bicycle frame, the seat post, the seat tube, the upper tube and the seat stays in a rigid and detachable manner to each other and to fix the position to each other.

DESCRIPTION OF THE PRIOR ART

Collapsible bicycles, which are also known as folding bicycles, are bicycles which comprise constructive apparatuses in order to fold the bicycle to form a small packing size and/or to disassemble the same. This allows easy transport in means of public transport for example such as railways or when transported in aircraft.

A typical example for such a folding bicycle is a bicycle with a frame which comprises approximately in the middle a hinge with a perpendicular pivot axis. As a result, the two parts of the frame which are connected to the hinge can be pivoted about approximately 180° with respect to each other, so that the front wheel and the rear wheel are subsequently arranged adjacent to each other. Small wheels (typically less than or equal to 22 inches) are usually used in order to save further space, wherein a more negative/unstable riding behaviour is accepted in comparison with bicycles with larger wheels (typically greater than or equal to 26 inches).

It is especially disadvantageous in these constructions that the stability of the frame leaves a good deal to be desired. This may be one of the reasons why there are hardly any folding bicycles in the area of mountain bikes or racing bikes, where obviously very high loads occur on the used bicycle frame.

A bicycle having a specific foldable frame is known from EP 2409906 A2. With regard to the general definition of the prior art DE 202012006459 U1 discloses a tricycle with a collapsible frame, WO 2013/016958 A1 discloses a bicycle frame which can be folded about one axis, and WO 2011/161657 A1 discloses a joint locking assembly suitable for a foldable bicycle frame.

OBJECTIVE OF THE INVENTION

It is therefore the object of the present invention to provide a foldable bicycle frame which withstands very high loads on the one hand, as occur for example in the intended use of mountain bikes or racing bikes, and which allows on the other hand a reduction in the packing size of a bicycle equipped with the bicycle frame in accordance with the invention, which ensures the easy transport thereof as a luggage item, especially for air travel.

PRESENTATION OF THE INVENTION

In order to ensure the highest possible stability of the bicycle frame, a shape has been selected which substantially corresponds or is similar to that of so-called diamond frames, and shows similarity with a rhombus. This shape obviously relates to the bicycle frame in an unfolded state, in which the bicycle frame is situated when a bicycle with said bicycle frame is used as intended for cycling. Accordingly, the foldable bicycle frame in accordance with the invention comprises a seat tube for accommodating a seat post, an upper tube, a head tube for accommodating a headset and fixing a fork, a lower tube, two chain stays (also referred to occasionally as lower stays) and two seat stays (also referred to occasionally as saddle stays). In order to still achieve a substantial reduction in the packing size of the bicycle frame, it is provided that at least the rear structure of the bicycle frame, which comprises the seat tube, the seat stays and the chain stays, can be pivoted relative to the remaining frame. This pivoting does not occur about a perpendicular axis, but by means of at least one rotation in a plane which is defined in the unfolded state of the bicycle frame by a longitudinal direction of the bicycle frame and a longitudinal axis of the seat tube, or at least one rotational axis corresponding to at least one rotation stands normally to said plane. A releasable locking mechanism produces a releasable connection between the rear structure and the upper tube.

A foldable bicycle frame is therefore provided, comprising a seat tube for accommodating a seat post, an upper tube, a head tube, a lower tube, two chain stays and two seat stays, wherein a first releasable locking mechanism is provided in order to connect, in an unfolded state of the bicycle frame, the seat post, the seat tube, the upper tube and the seat stays in a rigid and releasable manner to each other and to fix them with respect to each other in their position.

In order to allow folding the bicycle frame even more strongly and to thus achieve an even smaller packing size (in the folded state of the bicycle frame), wherein a high stability of the bicycle frame is still ensured, it is provided in a foldable bicycle frame in accordance with the invention that furthermore the upper tube and the lower tube are each connected in an articulated manner to the head tube, and that a second releasable locking mechanism is provided in order to rigidly connect, in the unfolded state of the bicycle frame, the upper tube and the lower tube to each other and to fix the position of the upper tube, the lower tube and the head tube with respect to each other. The articulated attachment allows pivoting the upper tube and the lower tube, especially relative to the head tube.

Furthermore, a cross-strut unit is provided in a preferred embodiment of the foldable bicycle frame in accordance with the invention, which cross-strut unit comprises two outer arms, a middle part for accommodating a bottom bracket bearing and an inner arm, wherein the outer arms are attached in an articulated manner to the lower tube. The articulated attachment allows pivoting the cross-strut unit and, in combination therewith, the chain stays, seat stays and the seat tube, especially relative to the upper tube, lower tube and head tube.

The cross-strut unit is formed in such a way that the greatest possible pivoting range of the rear structure can be realised in total, but also with respect to the individual components of the rear structure. At the same time, the configuration of the cross-strut unit still ensures the highest possible stability of the bicycle frame. That is why it is provided in a preferred embodiment of the foldable bicycle frame in accordance with the invention that the outer arms of the cross-strut unit connect its middle part to the lower tube in an articulated manner, that the middle part is rigidly connected to the chain stays and in an articulated manner to the seat tube, and that the inner arm is connected in an articulated manner both to the lower tube and also to the middle part. The outer arms are preferably connected at one end in an articulated manner to the lower tube and at another end in an articulated manner to the middle part. The articulated connection of the middle part to the seat tube allows additionally pivoting the seat tube, especially relative to the middle part. The articulated attachment of the inner arm to the lower tube and the middle part supports the pivotability of the middle part in relation to the lower tube and simultaneously increases the stability of the cross-strut unit.

In order to ensure a first locking mechanism, for the configuration of which only very few components are necessary and which still allows a highly stable and play-free connection and comprises a safeguard against inadvertent opening, it is provided in a preferred embodiment of the foldable bicycle frame in accordance with the invention that the first locking mechanism comprises the following: a lead-through fastened to the upper tube for accommodating the seat post in the unfolded state of the bicycle frame; a stop element fixed to the upper tube with a latching section and a stop element fixed to the seat tube with a latching section, wherein in the unfolded state of the bicycle frame the two stop elements are latched into each other by means of their latching sections; clamping jaws which are arranged on the one hand between the seat stays and are arranged on the other hand, in the unfolded state of the bicycle frame and when the seat post is accommodated in the seat tube, between the seat post and the stop elements; a toggle clamp, preferably a quick-action toggle clamp, wherein in a tightened state of the toggle clamp the seat stays are pressed against the clamping jaws. The lead-through for the seat post is used as a safeguard against inadvertent opening, i.e. as long as the seat post is accommodated in the lead-through and in the seat tube, the rear structure cannot be pivoted, even when the toggle clamp has already been released. In addition to the generally known quick-action toggle clamp, any other kind of toggle clamp can be used as a clamp, in the simplest of cases a screw plus nut which is arranged in respective lead-throughs or receivers in the seat stays. A quick-action toggle clamp is preferably used for enabling the rapid disassembly or folding of the bicycle frame.

The latching sections support a play-free connection. In order to further improve the latter, it is provided in a preferred embodiment of the foldable bicycle frame in accordance with the invention that the seat post comprises bevelled surfaces, that the clamping jaws comprise bevelled surfaces with which they are pressed, in the unfolded state of the bicycle frame and when the seat post is accommodated in the seat tube and when the toggle clamp is in the tightened state, against the bevelled surfaces of the seat post, wherein the bevelled surfaces of the seat post and the clamping jaws are formed in such a way that the clamping jaws are further pressed, in the unfolded state of the bicycle frame and when the seat post is accommodated in the seat tube and when the toggle clamp is in the tightened state, against the stop element of the upper tube and against the stop element of the seat tube. This pressing produces a substantially play-free connection between the upper tube, seat tube and seat post. The person skilled in the art is provided with many possibilities concerning the configuration of the bevelled surfaces of the seat post and the clamping jaws.

In the simplest of cases, the bevelled surfaces of the clamping jaws are formed in a flat way and enclose an angle of 45° with the longitudinal direction of the bicycle frame, wherein the bevelled surfaces of the seat post extend parallel to the bevelled surfaces of the clamping jaws. Flat bevelled surfaces can obviously also be provided which enclose a different angle with the longitudinal axis of the bicycle frame in order to vary the force component acting parallel to the longitudinal direction of the bicycle frame, wherein the force is produced by the tightening of the toggle clamp. Furthermore, flat bevelled surfaces can be provided which are also additionally tilted in relation to the longitudinal axis of the seat tube. It can finally be considered that the bevelled surfaces are curved at least in some sections in order to divide and vary in a purposeful manner a portion of the force produced by tightening the toggle clamp among force components, which are directed in the direction of the stop element of the upper tube and in the direction of the stop element of the seat tube.

In order to ensure a second locking mechanism, for the configuration of which only very few components are necessary and which still allows a highly stable and play-free connection, it is provided in a preferred embodiment of the foldable bicycle frame in accordance with the invention that the second locking mechanism comprises the following: a strut which is preferably formed in a substantially V-, U- or L-shaped manner and is rigidly connected to the upper tube at two fastening points thereof, wherein the fastening points are arranged one after the other as viewed in a longitudinal direction of the bicycle frame; a second toggle clamp, preferably a second quick-action toggle clamp, which in the unfolded state of the bicycle frame is arranged in a locking slot of the strut of the upper tube, wherein in the unfolded state of the bicycle frame and in a tightened state of the second toggle clamp the lower tube is pressed against the strut of the upper tube. A substantially play-free connection between the upper tube, lower tube and head tube is achieved by tightening the second toggle clamp. When the toggle clamp is open however, the upper tube and/or the lower tube can be pivoted in such a way that the second toggle clamp is no longer arranged in the locking slot or is moved out of said slot.

In a preferred embodiment, the upper tube and the lower tube are moved towards each other. That is why it is provided in an especially preferred embodiment of the foldable bicycle frame in accordance with the invention that the lower tube comprises two arms, between which, in the unfolded state of the bicycle frame, the strut of the upper tube is arranged in sections, and that in the unfolded state of the bicycle frame and in the tightened state of the second toggle clamp both arms of the lower tube are pressed against the strut of the upper tube. In this case, the strut of the upper tube is preferably always arranged at least in sections between the arms of the lower tube, even when the second locking mechanism is open or released or in the folded state of the bicycle frame.

In order to further increase the stability of the bicycle frame and to prevent that the seat tube can be pivoted before the entire rear structure was pivoted, especially when the seat tube is pivotable in relation to the middle part of the cross-strut unit, it is provided in an especially preferred embodiment of the foldable bicycle frame in accordance with the invention that the middle arm of the cross-strut unit comprises a snap-on section, that the seat tube comprises a snap-on section, and that in the unfolded state of the bicycle frame the two snap-on sections are latched into each other. The latched connection is only released by the rotation of the rear structure, so that before the rotation/pivoting of the rear structure the seat tube cannot be pivoted in relation to the middle part.

In order to optimise the pivoting range of the rear structure in its entirety and also the individual components of the rear structure, and to limit the pivoting movements to rotational movements in one plane at the same time for reasons of user-friendliness, it is provided in a preferred embodiment of the foldable bicycle frame in accordance with the invention that the outer arms of the cross-strut unit are rotatably mounted on the lower tube about a first rotational axis, that the outer arms of the cross-strut unit are rotatably mounted on the middle part of the cross-strut unit about a second rotational axis, that the seat tube is rotatably mounted on the middle part of the cross-strut unit about a third rotational axis, that the inner arm of the cross-strut unit is rotatably mounted on the middle part of the cross-strut unit about a fourth rotational axis, that the inner arm of the cross-strut unit is rotatably mounted on the lower tube about a fifth rotational axis, and that the first rotational axis, the second rotational axis, the third rotational axis, the fourth rotational axis and the fifth rotational axis are parallel with respect to each other.

It is similarly provided in a preferred embodiment of the bicycle frame in accordance with the invention to optimise the pivoting range of the upper tube and the lower tube, and to limit all pivoting movements to rotational movements in one plane at the same time for reasons of user-friendliness. At the same time, this configuration shall contribute to the highest possible stability of the bicycle frame. That is why it is provided in a preferred embodiment of the foldable bicycle frame in accordance with the invention that the lower tube is rotatably mounted about a sixth rotational axis relative to the head tube, that the upper tube is rotatably mounted about a seventh rotational axis relative to the head tube, and that the sixth rotational axis and the seventh rotational axis are parallel to the first rotational axis.

The packing size of the bicycle frame in the folded state can be reduced further in that the seat stays and chain stays can also be moved towards each other. That is why it is provided in a preferred embodiment of the foldable bicycle frame in accordance with the invention that that the seat stays are connected in an articulated manner to the chain stays.

It is further provided in a preferred embodiment of the bicycle frame in accordance with the invention to optimise the pivoting range between the seat stays and chain stays and to limit all pivoting movements to rotational movements in one plane at the same time for reasons of user-friendliness. Therefore it is provided in a preferred embodiment of the foldable bicycle frame in accordance with the invention that seat stays are rotatably mounted relative to the chain stays about an eighth rotational axis, wherein the eighth rotational axis is parallel to the first rotational axis.

Similar to the statements made above, a bicycle with a foldable bicycle frame in accordance with the invention is provided in accordance with the invention, said bicycle comprising a front bicycle wheel and a rear bicycle wheel, a fork with a steer tube and a handlebar and a handlebar stem which connects the handlebar and the steer tube. The bicycle wheels can have sizes which are typical for mountain bikes, i.e. especially 26 to 29 inches, or typical for racing bikes, i.e. mostly 28 inches. In order to transport the bicycle with a small packing size, e.g. on a plane, the bicycle wheels are dismounted and the bicycle frame is then folded.

In order to enable an especially small packing size of the bicycle, it is provided in a preferred embodiment of the bicycle in accordance with the invention that a quick-action toggle clamp is provided in order to releasably fix the handlebar with the handlebar stem to the steer tube. This also allows rapidly dismounting the handlebar for transport. The seat post with the saddle and the handlebar plus the stem can preferably be stored in a compact manner in free spaces between the individual components of the bicycle frame in the folded state.

BRIEF DESCRIPTION OF THE DRAWINGS

The invention will be explained below in closer detail by reference to an embodiment. The drawings are provided by way of example and although they explain the inventive concept, they shall not in any way limit the scope thereof or reproduce the same with finality, wherein.

DESCRIPTION OF THE PREFERRED EMBODIMENTS

Figure 1:
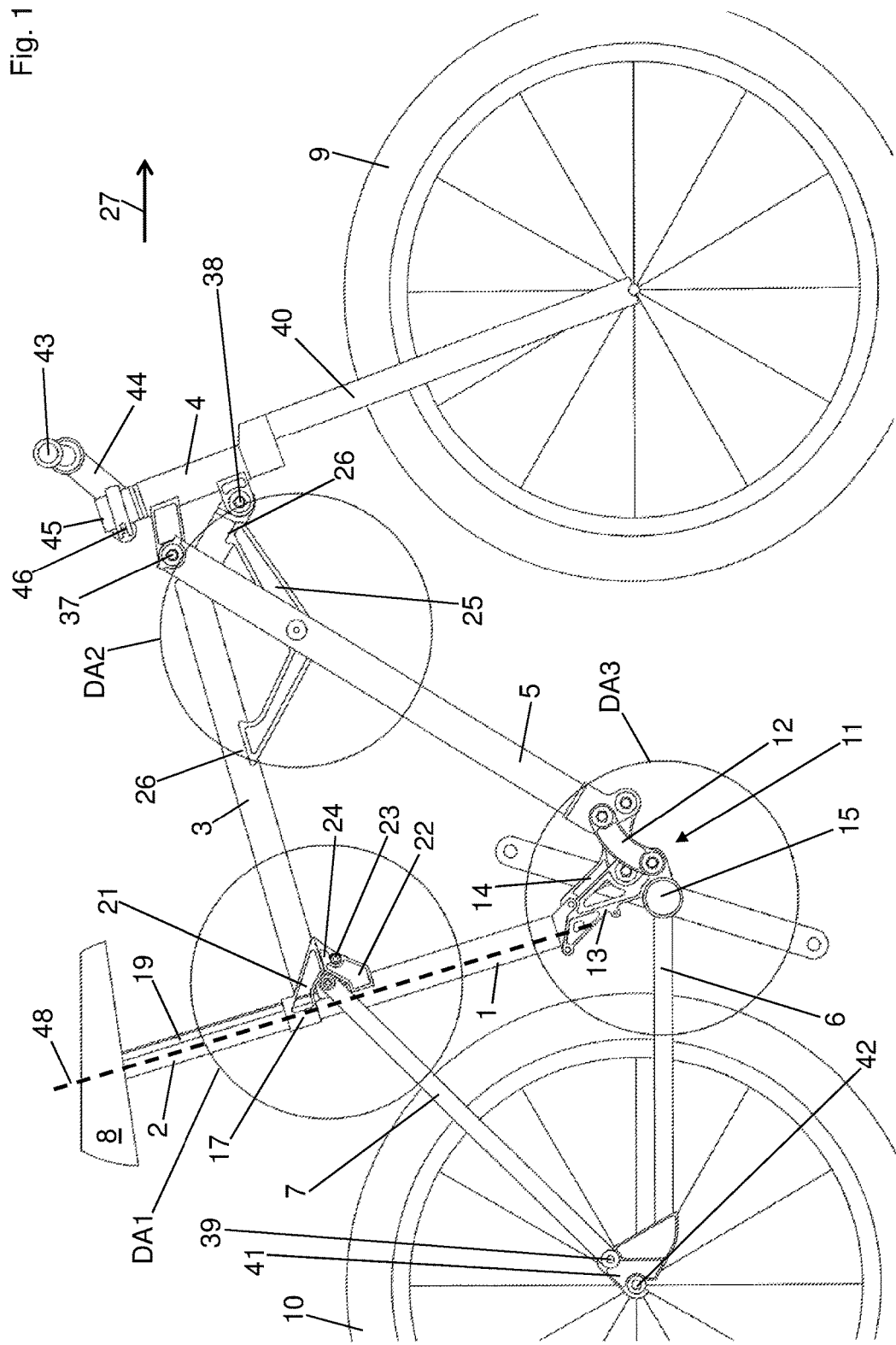
FIG. 1 shows a side view of a bicycle with a bicycle frame in accordance with the invention.

A bicycle with a foldable bicycle frame in accordance with the invention is shown in the side view of FIG. 1, wherein the bicycle is ready for operation, i.e. the bicycle frame is not in the folded but unfolded state. The shape of the bicycle frame is approximately rhombic. The bicycle frame comprises a seat tube 1 for accommodating a seat post 2 with a saddle 8, an upper tube 3, a head tube 4 for accommodating a headset (not shown) and fixing a fork 40, a lower tube 5, two chain stays 6 and two seat stays 7.

The fork 40 comprises a steer tube 45, on which a handlebar stem 44 plus a handlebar 43 are fixed by means of a quick-action toggle clamp 46.

The fork 40 guides a front bicycle wheel 9. A rear bicycle wheel 10 is arranged with an axle 42 in drop out ends 41, wherein the drop out ends 41 are connected to the seat stays 7 and the chain stays 6. The front wheel 9 and the rear wheel 10 are preferably fixed with quick-action toggle clamps (not shown).

The bicycle frame extends in the unfolded state along a longitudinal direction 27, wherein the bicycle wheels 9, 10 are arranged one after the other, as viewed in the longitudinal direction 27. The longitudinal direction 27 and a longitudinal axis 48 of the seat tube 1 define a plane in which all rotational or pivoting movements occur which are necessary for the folding (and obviously also for the unfolding). The axis 42 stands normally to said plane.

A rear structure of the bicycle frame comprises the seat tube 1, the seat stays 7 and the chain stays 6. The latter are rigidly connected at one end to a bottom bracket bearing 15.

In order to enable the pivoting of the rear structure during folding of the bicycle frame, a cross-strut unit 11 is provided, which connects the lower tube 5, the seat tube 1 and the chain stays 6 to each other. For this purpose, the cross-strut unit 11 comprises two outer arms 12, a middle part 13 for accommodating the bottom bracket bearing 15, and an inner arm 14, wherein the outer arms 12 and the inner arm 14 are connected to the lower tube 5 and the middle part 13 in an articulated manner.

Figure 2:
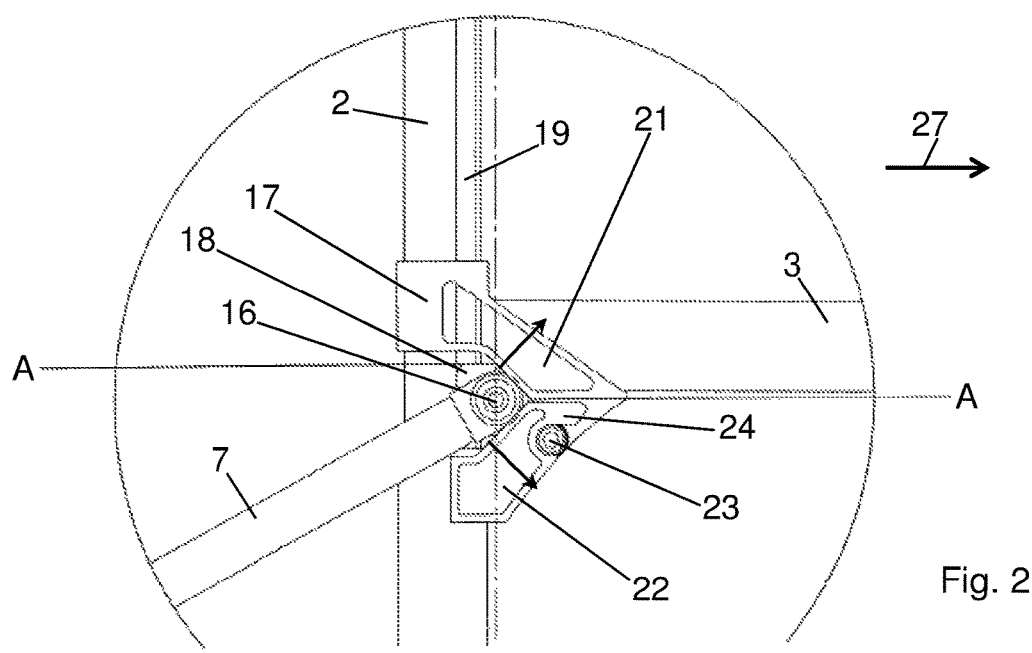
FIG. 2 shows an enlarged view of the detail DA1 of FIG. 1.

The bicycle frame is fixed in the unfolded state in any case by a first locking mechanism, with which the upper tube 3, the seat post 2, the seat tube 1 and the seat stays 7 can be rigidly connected to each other and separately detachably from each other, and can be fixed in position with respect to each other. FIG. 2 shows an enlarged view of the detail DA1 of FIG. 1. The illustration clearly shows that a lead-through 17 is fixed to the upper tube 3, which belongs to the first locking mechanism and in which the seat post 2 is accommodated in the unfolded state when the seat post 2 is arranged in the seat tube 1. The seat post 2 thus acts as a securing means, i.e. as long as the seat post 2 is accommodated in the seat tube 1 and the lead-through 17, the rear structure cannot be pivoted away from the upper tube 3, and especially not the seat tube 1.

The first locking mechanism further comprises a stop element 21 which is fixed to the upper tube 3 and comprises a latching section 23 and a stop element 22 which is fixed to the seat tube and comprises a latching section 24, wherein, in the illustrated unfolded state of the bicycle frame, the two stop elements 21, 22 are latched into each other by means of their latching sections 23, 24. In the illustrated embodiment, the latching section 23 is formed in the manner of a pin and the latching section 24 is formed as a recess of the stop element 22, wherein the pin is arranged in the recess in the unfolded state. Furthermore, the stop elements 21, 22 comprise flat sections, which in the illustrated embodiment extend substantially parallel to the upper tube 3 in the unfolded state and rest on each other in order to further improve the stability of the bicycle frame.

The first locking mechanism further comprises clamping jaws 18, which are arranged on the one hand between the seat stays 7 and are arranged on the other hand between the seat post 2 and the stop elements 21, 22 in the unfolded state of the bicycle frame and when the seat post 2 is accommodated in the seat tube 1.

Finally, the first locking mechanism comprises a quick-action toggle clamp 16, which is guided through recesses/lead-throughs at the ends of the seat stays.

Figure 3:
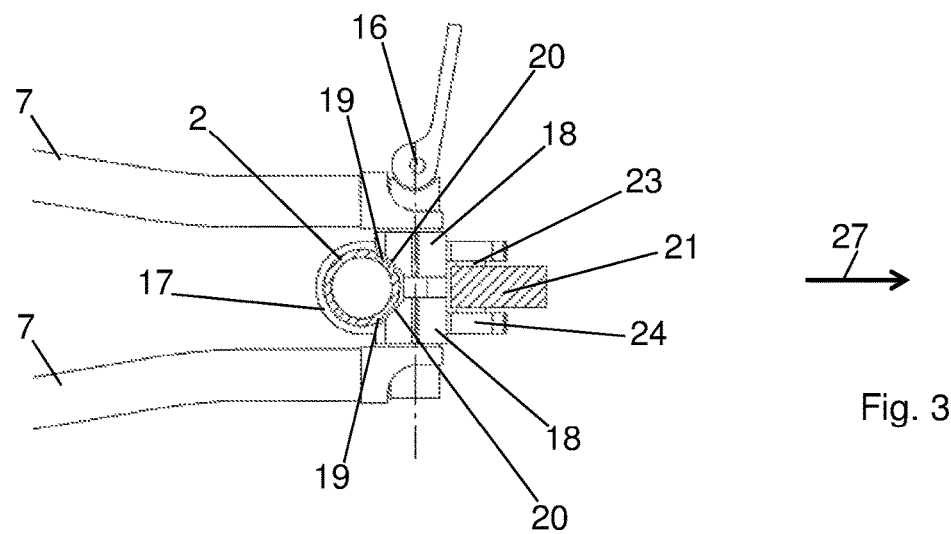
FIG. 3 shows a sectional view according to the line of intersection A-A of FIG. 2 with an open toggle clamp.

The sectional view of FIG. 3 illustrates the situation when the quick-action toggle clamp 16 is open. Although contact of the clamping jaws 18 with the seat post 2 and the stop elements 21, can occur in this case, no pressure or only a negligible pressure is exerted by the clamping jaws 18 on the seat post 2 or on the stop elements 21, 22.

Figure 4:
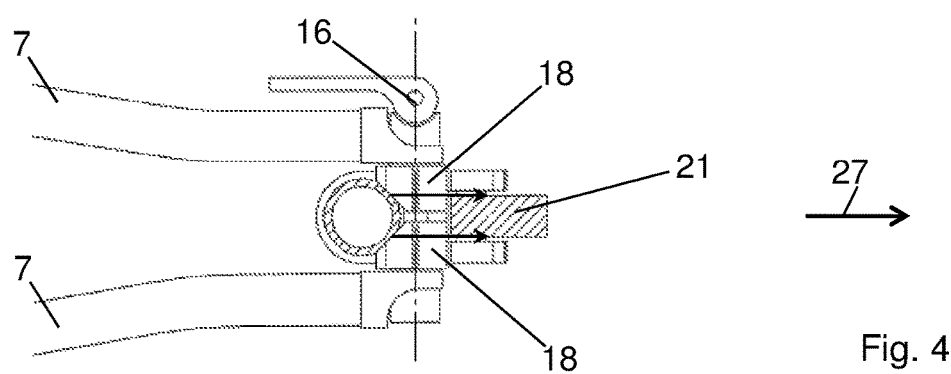
FIG. 4 shows a sectional view along the line of intersection A-A of FIG. 2 with a tightened toggle clamp.

The sectional view of FIG. 4 shows the situation when the quick-action toggle clamp 16 has been tightened. The ends of the seat stays 7 press against the clamping jaws 18, as a result of which the clamping jaws 18 press against the seat post 2 and fix the same. In this process, the clamping jaws 18 rest with bevelled surfaces 20 on respective bevelled surfaces 19 of the seat post 2, which surfaces extend in parallel. In the illustrated embodiment, the bevelled surfaces 19, 20 are formed as flat surfaces which enclose an angle of approximately 45° with the longitudinal direction 27. This produces a component of the force produced by the tightened quick-action toggle clamp 16 parallel to the longitudinal direction 27, which is indicated in FIG. 4 by the illustrated arrows. Consequently, the clamping jaws 18 not only press against the seat post 2, but also against the stop elements 21 and 22, which is indicated in FIG. 2 by the illustrated arrows. This ensures a substantially play-free connection between the upper tube 3, seat tube 1, seat post 2 and seat stays 7.

Figure 5:
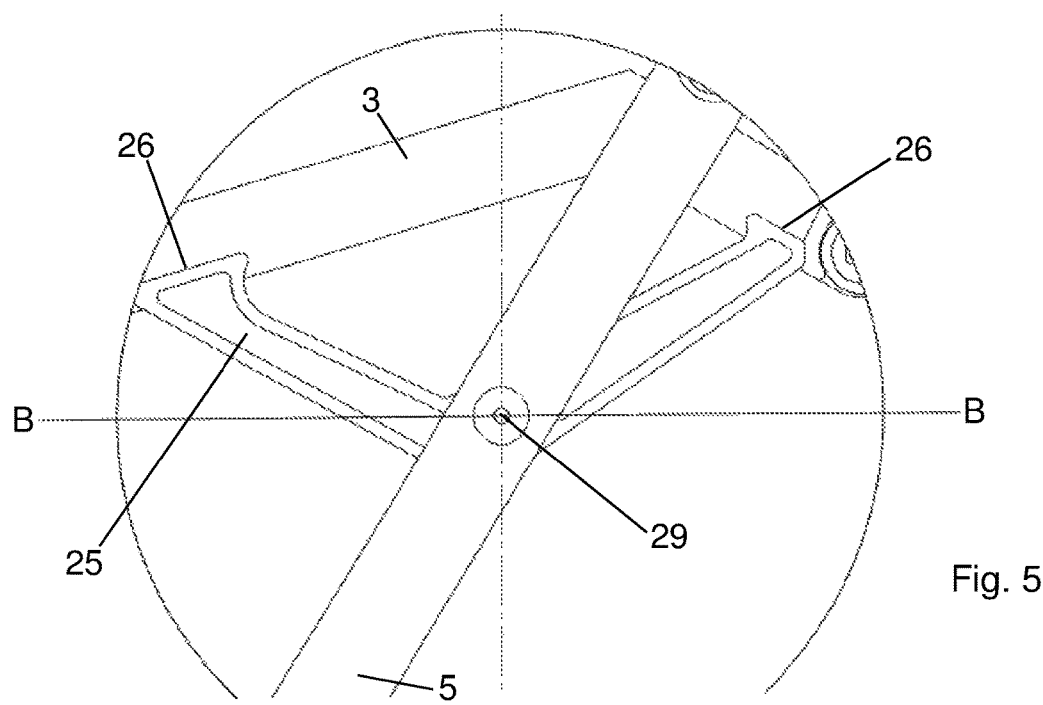
FIG. 5 shows an enlarged view of the detail DA2 of FIG. 1.

In the illustrated embodiment, the upper tube 3 and the lower tube 5 are connected to the head tube 4 in an articulated manner. That is why a second releasable locking mechanism is further provided in order to rigidly connect the upper tube 3 and the lower tube 5 to each other in the unfolded state of the bicycle frame and to fix the position of the upper tube 3, the lower tube 5 and the head tube 4 to each other. The second locking mechanism comprises a strut 25, which is preferably formed in a substantially V-shaped or L-shaped manner and is rigidly connected to the upper tube 3 at two fastening points 26 thereof, wherein the fastening points 26 are arranged one behind the other as viewed in the longitudinal direction 27 (see FIG. 5). In the readiness state of the bicycle, the strut 25 faces downwardly from the upper tube 3.

The second locking mechanism further comprises a second quick-action toggle clamp 29, which in the unfolded state of the bicycle frame is arranged in a locking slot 28 (see FIG. 12) of the strut 25 of the upper tube 3, wherein in the unfolded state of the bicycle frame and in a tightened state of the second quick-action toggle clamp 29 the lower tube 5 is pressed against the strut 25 of the upper tube 3.

Figure 6:
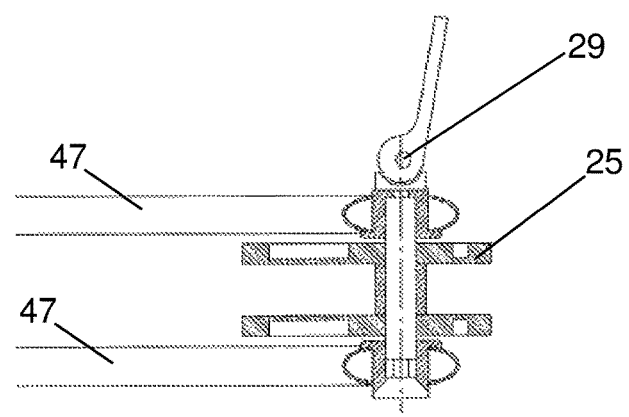
FIG. 6 shows a sectional view according to the line of intersection B-B of FIG. 5 with an open second toggle clamp.

FIG. 6 illustrates the situation when the second quick-action toggle clamp 29 is open. The illustration clearly shows that in the illustrated embodiment the lower tube 5 comprises two arms 47, between which the strut 25 is always arranged in some sections. Since the lower tube 5 is split in the front region into the two arms 47, the crossing of the upper tube 3 and the lower tube 5, as viewed in the longitudinal direction 27, is enabled before the head tube 4, in that the upper tube 3 can extend between the arms 47.

Figure 7:
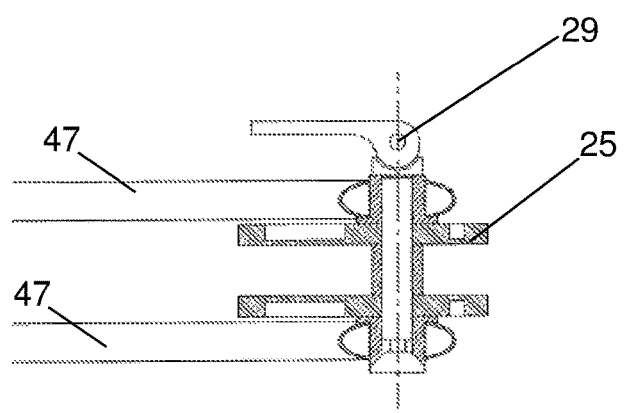
FIG. 7 shows a sectional view according to the line of intersection B-B of FIG. 5 with a tightened second toggle clamp.

As is shown in FIG. 7, both arms 47 are pressed against the strut 25 in the unfolded state of the bicycle frame and when the second quick-action toggle clamp 29 is tightened. The upper tube 3 and the lower tube 5 are thus connected to each other in a substantially play-free manner, and the position of the upper tube 3, lower tube 5 and head tube 4 with respect to each other is fixed.

Figure 8:
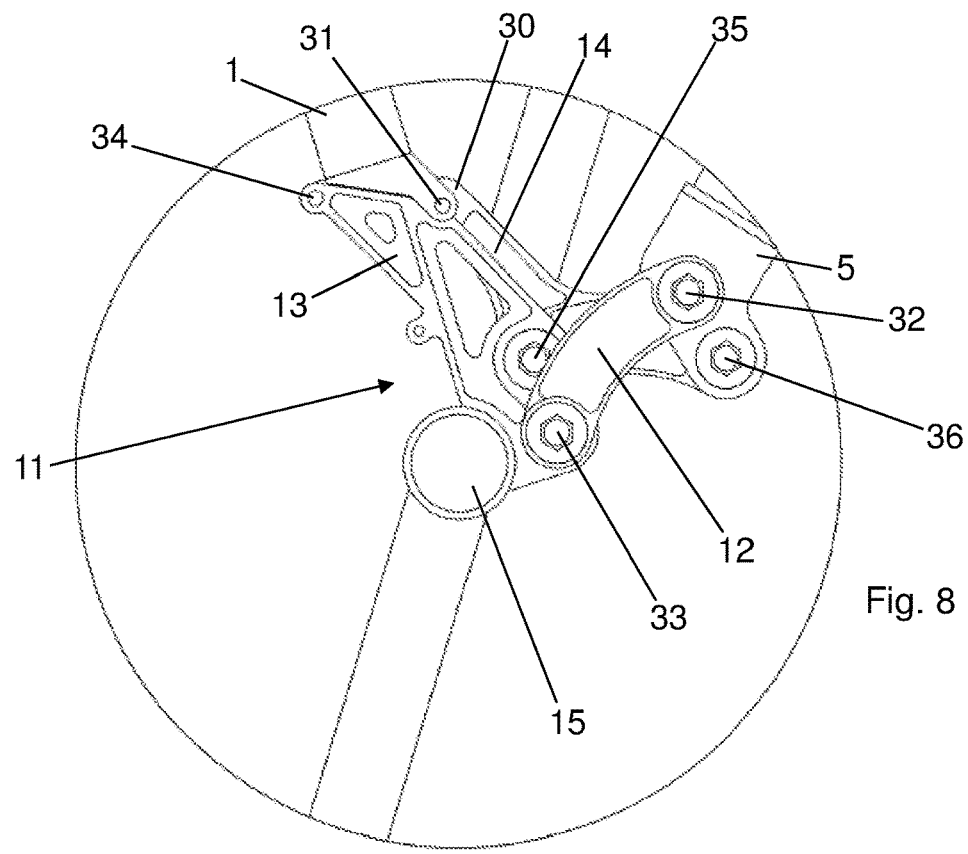
FIG. 8 shows an enlarged view of the detail DA3 of FIG. 1.
Figure 9:
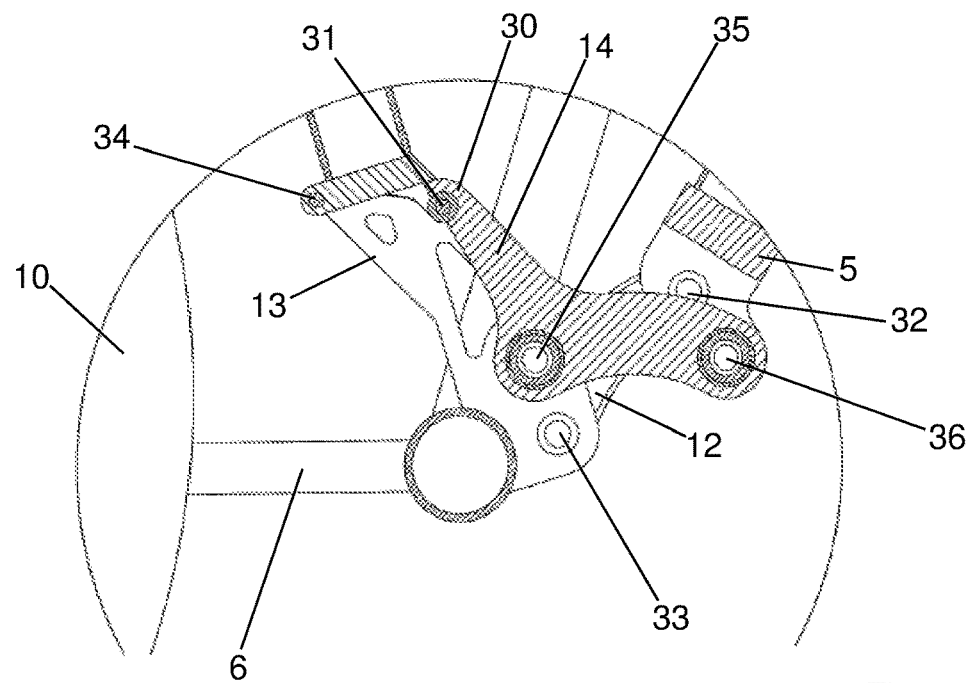
FIG. 9 shows a sectional view similar to FIG. 8.

FIG. 8 shows an enlarged view of the detail DA3 of FIG. 1. As is shown in FIG. 8 and even more clearly in the sectional view of FIG. 9, the middle arm 14 of the cross-strut unit 11 comprises a latching section 30 and the seat tube 1 a latching section 31, wherein in the unfolded state of the bicycle frame the two latching sections 30, 31 are latched into each other. In the illustrated embodiment, the latching section 31 is formed in the manner of a pin and the latching section 30 as a recess in which the pin can be accommodated.

FIG. 8 further shows that the outer arms 12 of the cross-strut unit 11 are rotatably mounted on the lower tube 5 about a first rotational axis 32, that the outer arms 12 are rotatably mounted on the middle part 13 of the cross-strut unit 11 about a second rotational axis 33, that the seat tube 1 is rotatably mounted on the middle part 13 about a third rotational axis 34, that the inner arm 14 of the cross-strut unit 11 is rotatably mounted on the middle part 13 about a fourth rotational axis 35, that the inner arm 14 is rotatably mounted on the lower tube 5 about a fifth rotational axis 36, and that the rotational axes 32, 33, 34, 35, 36 are arranged in parallel with respect to each other. The rotational axes 32, 33, 34, 35, 36 stand normally to the plane defined by the longitudinal direction 27 and the longitudinal axis 48 of the seat tube 1.

The upper tube 3 and the lower tube 5 are also mounted about rotational axes, i.e. the upper tube 3 about a sixth rotational axis 37 and the lower tube about a seventh rotational axis 38 (see FIG. 1). In the illustrated embodiment and when the bicycle is ready for operation, the sixth rotational axis 37 is arranged above the seventh rotational axis 38. The rotational axes 37, 38 are parallel to the first rotational axis 32.

Figure 14:
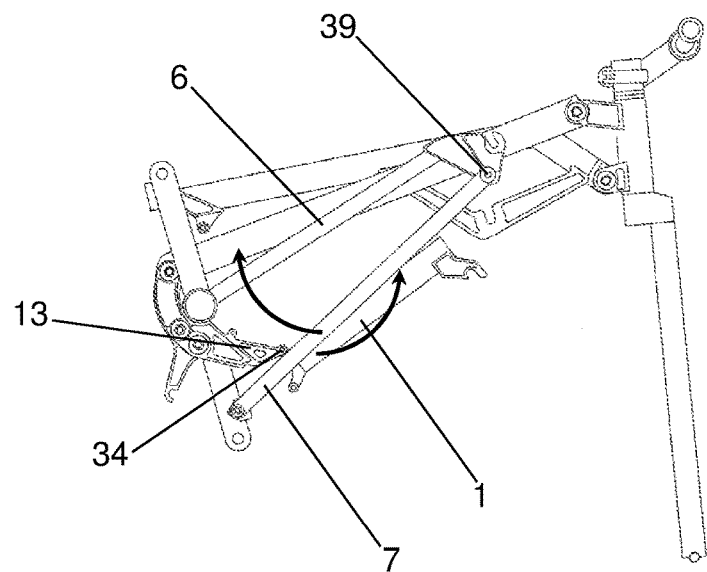
FIG. 14 shows the bicycle frame of FIG. 13 after pivoting movements of the seat tube and the seat stays.

Finally, the seat stays 7 are also rotatably mounted, namely about an eighth rotational axis 39, which is also parallel to the first rotational axis 32 (see FIGS. 1 and 14).

As will be explained below in closer detail, the transfer of the bicycle frame from the unfolded state to the folded state is enabled by a sequence of pivoting movements, i.e. a bicycle frame is obtained which is folded in a highly compact manner and which in the unfolded state still meets high stability requirements.

FUNCTIONALITY OF THE INVENTION

Figure 10:
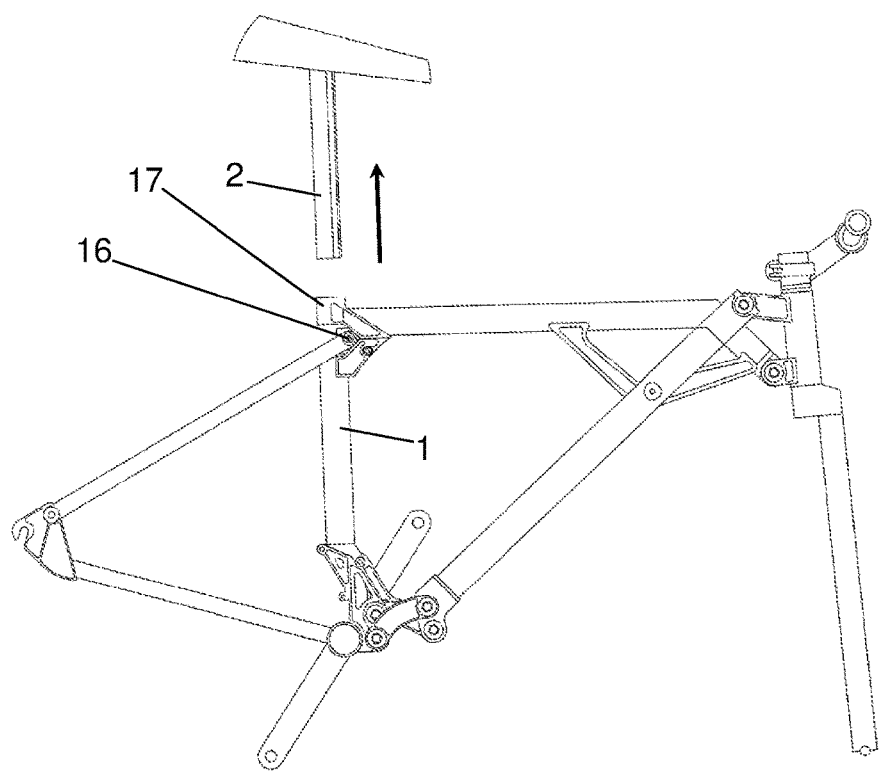
FIG. 10 shows the bicycle frame in accordance with the invention with a released first locking mechanism.

FIG. 10 shows the bicycle frame in accordance with the invention in the embodiment of FIG. 1 with released first locking mechanism. The seat post 2 has been pulled from the seat tube 1 and the lead-through 17, which is indicated by the arrow in FIG. 10. The rear structure can thus be pivoted.

Figure 11:
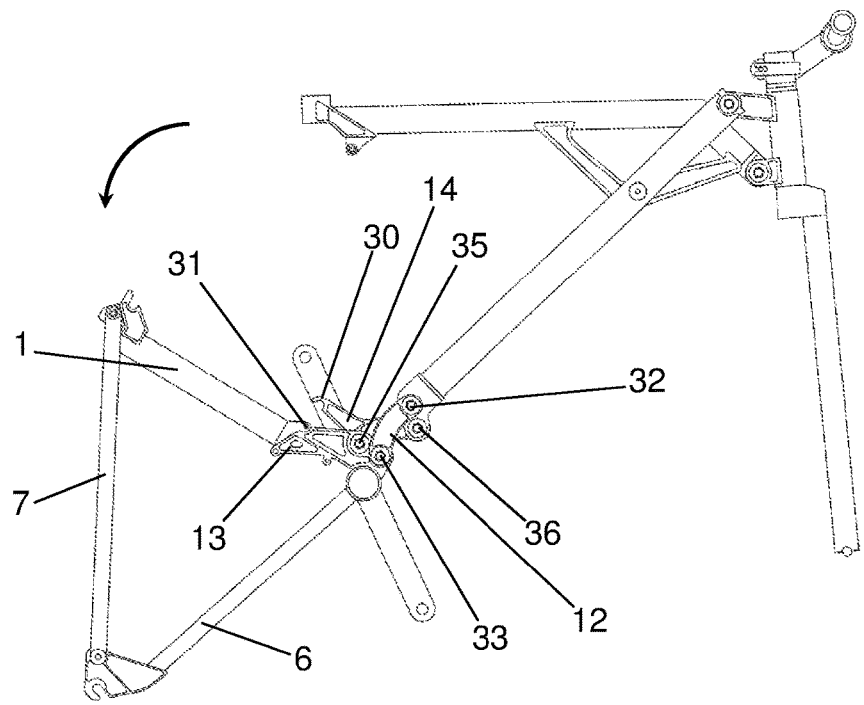
FIG. 11 shows the bicycle frame of FIG. 10 after pivoting a rear structure of the bicycle frame.

On the one hand, a rotation of the middle part 13 occurs relative to the arms 12 about the second rotational axis 33. At the same time, the middle part 13 is also twisted relative to the inner arm 14 about the fourth rotational axis 35, so that the latching sections 30, 31 are no longer latched into each other. Furthermore, the inner arm 14 also rotates relative to the lower tube 5 about the fifth rotational axis 36. Finally, a minor rotation of the arms 12 occurs relative to the lower tube 5 about the first rotational axis 32. FIG. 11 shows the state after these rotations, which all occur with the same direction of rotation, wherein the direction of rotation is indicated by the arrow in FIG. 11 (counter-clockwise in the illustration).

Figure 12:
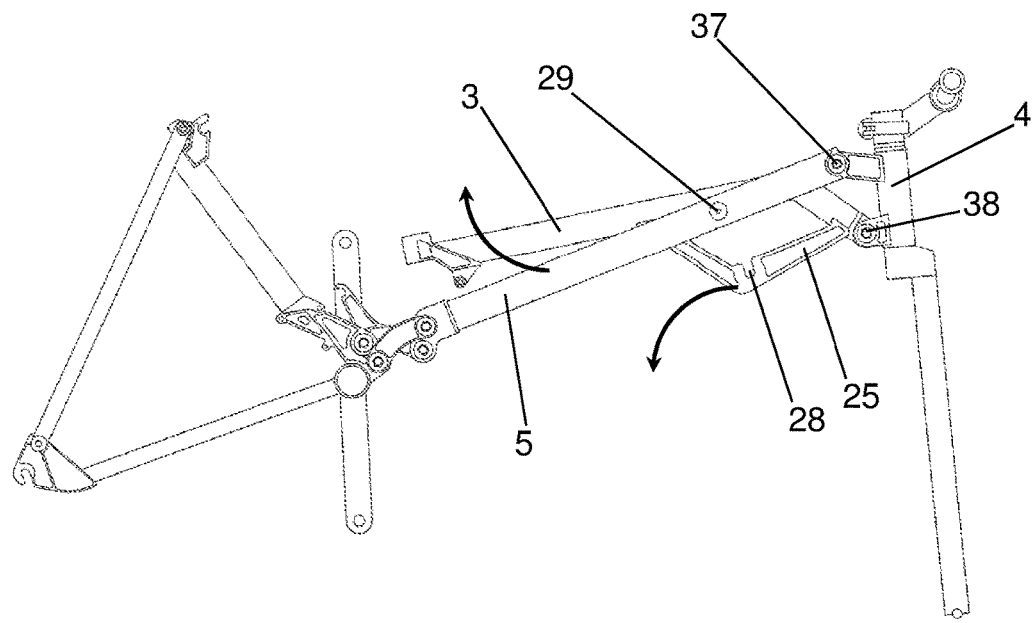
FIG. 12 shows the bicycle frame of FIG. 11 with a released second locking mechanism, a pivoted upper tube, and a pivoted lower tube.

The second locking mechanism is now released. The upper tube 3 is then twisted about the seventh rotational axis 38 relative to the head tube 4 in the downward direction, which is indicated in FIG. 12 by the arrow in the counter-clockwise direction. Furthermore, the lower tube 5 is twisted relative to the head tube 4 about the sixth rotational axis 37 in the upward direction, which is indicated in FIG. 12 by the arrow in the clockwise direction. The second quick-action toggle clamp 29 is moved out of the locking slot 28 of the stop 25 by moving the upper tube 3 and the lower tube 5 towards each other. FIG. 12 shows the state after these rotational movements of upper tube 3 and lower tube 5.

Figure 13:
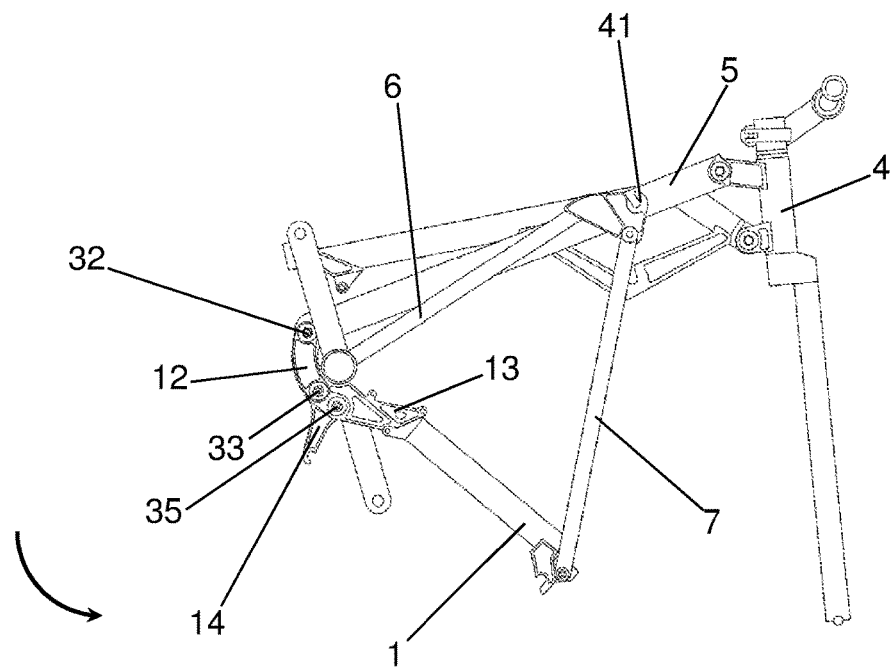
FIG. 13 shows the bicycle frame of FIG. 12 after a further pivoting movement of the rear structure.

A renewed pivoting of the rear structure occurs, wherein FIG. 13 shows the bicycle frame after the pivoting movement. The arms 12 rotate relative to the lower tube 5 about the first rotational axis 32 during this pivoting movement. The middle part 13 rotates relative to the arms 12 about the second rotational axis 33 and relative to the inner arm 14 about the fourth rotational axis 35. Furthermore, the inner arm 14 rotates relative to the lower tube 5 about the fifth rotational axis 36 (not shown in FIG. 13). These rotational movements are again carried out in the same direction of rotation, which in FIG. 13 are indicated by the arrow in the counter-clockwise direction. The rear structure is thus successively twisted or folded with constant direction of rotation and moved towards the head tube 4. In this stage of the folding process, which is shown in FIG. 13, the front fork ends 41 are already above the lower tube 5.

A folding of the rear structure occurs now. In this process, the seat stays 7 are twisted about the eighth rotational axis 39 in the direction of the chain stays 6, which is indicated in FIG. 14 by the arrow with the clockwise direction. Furthermore, the seat tube 1 is folded in, in that it is twisted relative to the middle part 13 about the third rotational axis 34, which is indicated in FIG. 14 by the arrow with the counter-clockwise direction.

Figure 15:
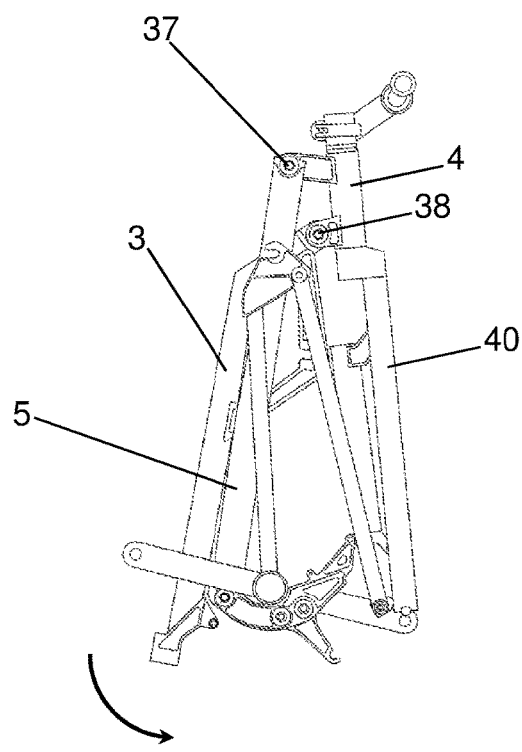
FIG. 15 shows the bicycle frame in accordance with the invention in a (completely) folded state, i.e. the bicycle frame of FIG. 14 after a final pivoting movement of the upper tube and lower tube.

Finally, a renewed pivoting of the upper tube 3 and the lower tube 5 occurs about the seventh rotational axis 38 and the sixth rotational axis 37. Both rotations are carried out in the same direction of rotation, so that the upper tube 3 and the lower tube 5 and thus also the entire rear structure can be moved towards the head tube 4 and the fork 40. FIG. 15 shows the bicycle frame after these rotations, wherein the arrow with the counter-clockwise direction indicates the direction of rotation.

The procedure is carried out in the reverse manner for bringing about the unfolded state of the bicycle frame again.

LIST OF REFERENCE NUMERALS

1 Seat tube
2 Seat post
3 Upper tube
4 Head tube
5 Lower tube
6 Chain stay
7 Seat stay
8 Saddle
9 Front wheel
10 Rear wheel
11 Cross-strut unit
12 Outer arm of the cross-strut unit
13 Middle part of the cross-strut unit
14 Inner arm of the cross-strut unit
15 Bottom bracket bearing
16 Quick-action toggle clamp
17 Lead-through for the seat post
18 Clamping jaw
19 Bevelled surface of the seat post
20 Bevelled surface of the clamping jaw
21 Stop element of the upper tube
22 Stop element of the seat tube
23 Latching section of the stop element of the upper tube
24 Latching section of the stop element of the seat tube
25 Strut of the upper tube
26 Fastening point to the upper tube for fixing the strut of the upper tube
27 Longitudinal direction of the bicycle frame
28 Locking slot of the strut of the upper tube
29 Second quick-action toggle clamp
30 Latching section of the middle arm of the cross-strut unit
31 Latching section of the seat tube
32 First rotational axis
33 Second rotational axis
34 Third rotational axis
35 Fourth rotational axis
36 Fifth rotational axis
37 Sixth rotational axis 38 Seventh rotational axis
39 Eighth rotational axis
40 Fork
41 Drop out ends
42 Axle of the rear wheel
43 Handlebar
44 Handlebar stem
45 Steer tube
46 Quick-action toggle clamp on the handlebar stem
47 Arm of the lower tube
48 Longitudinal axis of the seat tube

The invention claimed is:

1. A foldable bicycle frame, comprising a seat tube (1) for accommodating a seat post (2), an upper tube (3), a head tube (4), a lower tube (5), two chain stays (6) and two seat stays (7), wherein a first releasable locking mechanism is provided in order to connect, in an unfolded state of the bicycle frame, the seat post (2), the seat tube (1), the upper tube (3) and the seat stays (7) in a rigid and detachable manner to each other and to fix their position to each other, characterized in that the upper tube (3) and the lower tube (5) are each connected to the head tube (4) in an articulated manner, and that a second releasable locking mechanism is provided in order to rigidly connect, in the unfolded state of the bicycle frame, the upper tube (3) and the lower tube (5) to each other and to fix the position of the upper tube (3), the lower tube (5) and the head tube (4) to each other.

2. A foldable bicycle frame according to claim 1, characterized in that a cross-strut unit (11) is provided, which comprises two outer arms (12), a middle part (13) for accommodating a bottom bracket bearing (15) and an inner arm (14), wherein the outer arms (12) are attached in an articulated manner to the lower tube (5).

3. A foldable bicycle frame according to claim 2, characterized in that the outer arms (12) of the cross-strut unit (11) connect its middle part (13) to the lower tube (5) in an articulated manner, that the middle part (13) is connected to the chain stays (6) in a rigid manner and to the seat tube (1) in an articulated manner, and that the inner arm (14) is connected in an articulated manner both to the lower tube (5) and also to the middle part (13).

4. A foldable bicycle frame according to claim 3, characterized in that the first releasable locking mechanism comprises: a lead-through (17) fixed to the upper tube (3) for accommodating the seat post (2) in the unfolded state of the bicycle frame;
a stop element (21) which is fixed to the upper tube (3) and comprises a latching section (23), a stop element (22) which is fixed to the seat tube (1) and comprises a latching section (24), wherein, in the unfolded state of the bicycle frame, the two stop elements (21, 22) are latched into each other by means of their latching sections (23, 24);
clamping jaws (18), which are arranged on the one hand between the seat stays (7) and which are arranged on the other hand, in the unfolded state of the bicycle frame and when the seat post (2) is accommodated in the seat tube (1), between the seat post (2) and the stop elements (21, 22);
a toggle clamp, wherein the seat stays (7) are pressed against the clamping jaws (18) in a tightened state of the toggle clamp.

5. A foldable bicycle frame according to claim 4, characterized in that the seat post (2) comprises bevelled surfaces (19), that the clamping jaws (18) comprise bevelled surfaces (20) with which they are pressed against the bevelled surfaces (19) of the seat post (2) in the unfolded state of the bicycle frame, when the seat post (2) is accommodated in the seat tube (1), and when the toggle clamp is in the tightened state,
wherein the bevelled surfaces (19, 20) of the seat post (2) and the clamping jaws (18) are formed in such a way that the clamping jaws (18) are further pressed against the stop element (21) of the upper tube (3) and against the stop element (22) of the seat tube (1) in the unfolded state of the bicycle frame, when the seat post (2) is accommodated in the seat tube (1), and when the toggle clamp is in the tightened state.

6. A foldable bicycle frame according to claim 4, characterized in that the toggle clamp is a quick-action toggle clamp (16).

7. A foldable bicycle frame according to claim 2, characterized in that the middle arm (14) of the cross-strut unit (11) comprises a latching section (30), that the seat tube (1) comprises a latching section (31), and that the two latching sections (30, 31) are latched into each other in the unfolded state of the bicycle frame.

8. A foldable bicycle frame according to claim 2, characterized in that the outer arms (12) of the cross-strut unit (11) are rotatably mounted on the lower tube (5) about a first rotational axis (32),
that the outer arms (12) of the cross-strut unit (11) are rotatably mounted on the middle part (13) of the cross-strut unit (11) about a second rotational axis (33),
that the seat tube (1) is rotatably mounted on the middle part (13) of the cross-strut unit (11) about a third rotational axis (34),
that the inner arm (14) of the cross-strut unit (11) is rotatably mounted on the middle part (13) of the cross-strut unit (11) about a fourth rotational axis (35),
that the inner arm (14) of the cross-strut unit (11) is rotatably mounted on the lower tube (5) about a fifth rotational axis (36),
and that the first rotational axis (32), the second rotational axis (33), the third rotational axis (34), the fourth rotational axis (35) and the fifth rotational axis (36) are parallel to each other.

9. A foldable bicycle frame according to claim 8, characterized in that the lower tube (5) is rotatably mounted relative to the head tube (4) about a sixth rotational axis (37),
that the upper tube (3) is rotatably mounted relative to the head tube (4) about a seventh rotational axis (38),
and that the sixth rotational axis (37) and the seventh rotational axis (38) are parallel to the first rotational axis (32).

10. A foldable bicycle frame according to claim 8, characterized in that the seat stays (7) are connected to the chain stays (6) in an articulated manner.

11. A foldable bicycle frame according to claim 10, characterized in that the seat stays (7) are rotatably mounted relative to the chain stays (6) about an eighth rotational axis (39), wherein the eighth rotational axis (39) is parallel to the first rotational axis (32).

12. A foldable bicycle frame according to claim 1, characterized in that the second releasable locking mechanism comprises: a strut (25), which is rigidly connected to the upper tube (3) at two fastening points (26) thereof, wherein the fastening points (26) are arranged one behind the other as viewed in a longitudinal direction (27) of the bicycle frame;
a second toggle clamp, which in the unfolded state of the bicycle frame is arranged in a locking slot (28) of the strut (25) of the upper tube (3), wherein the lower tube (5) is pressed against the strut (25) of the upper tube (3)

in the unfolded state of the bicycle frame and in the tightened state of the second toggle clamp.

13. A foldable bicycle frame according to claim 12, characterized in that the lower tube (5) comprises two arms (47), between which, in the unfolded state of the bicycle frame, the strut (25) of the upper tube (3) is arranged in sections, and that both arms (47) of the lower tube (5) are pressed against the strut (25) of the upper tube (3) in the unfolded state of the bicycle frame and when the second toggle clamp is tightened.

14. A foldable bicycle frame according to claim 12, characterized in that the second toggle clamp is a second quick-action toggle clamp (29).

15. A foldable bicycle frame according to claim 12, characterized in that the strut (25) is formed in a substantially V-shaped, U-shaped or L-shaped manner.

16. A bicycle with a foldable bicycle frame according to claim 1, the bicycle comprising a front wheel (9) and a rear wheel (10), a fork (40) with a steer tube (45), as well as a handlebar (43) and a handlebar stem (44) which connects the handlebar and the steer tube (45).

17. A bicycle according to claim 16, characterized in that a quick-action toggle clamp (46) is provided on the handlebar stem (44) in order to releasably fix the handlebar (43) with the handlebar stem (44) to the steer tube (45).

* * * * *